United States Patent
Chang et al.

(10) Patent No.: US 10,717,796 B2
(45) Date of Patent: Jul. 21, 2020

(54) ETHYLENE VINYL ALCOHOL COPOLYMER PELLET, METHOD FOR EXTRUSION OF THE PELLET AND EXTRUSION MOLDED FILM PRODUCED THEREBY

(71) Applicant: CHANG CHUN PETROCHEMICAL CO., LTD., Taipei (TW)

(72) Inventors: Huan Ming Chang, Taipei (TW); Weng Shing Lin, Taipei (TW); Chih Chieh Liang, Taipei (TW); Chia Hao Hsu, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/029,063

(22) Filed: Jul. 6, 2018

(65) Prior Publication Data

US 2020/0010591 A1    Jan. 9, 2020

(51) Int. Cl.
| C08F 216/06 | (2006.01) |
| C08J 5/18 | (2006.01) |
| B32B 27/08 | (2006.01) |
| B32B 27/30 | (2006.01) |
| B29B 9/06 | (2006.01) |
| B29K 23/00 | (2006.01) |

(52) U.S. Cl.
CPC ............... *C08F 216/06* (2013.01); *B29B 9/06* (2013.01); *B32B 27/08* (2013.01); *B32B 27/306* (2013.01); *C08J 5/18* (2013.01); *B29K 2023/086* (2013.01); *C08J 2329/04* (2013.01)

(58) Field of Classification Search
None
See application file for complete search history.

(56) References Cited

U.S. PATENT DOCUMENTS

| 2004/0048080 A1* | 3/2004 | Schell | B32B 27/08 428/474.4 |
| 2008/0281045 A1* | 11/2008 | Zhang | B32B 27/08 525/58 |
| 2016/0215116 A1* | 7/2016 | Kani | C08L 77/00 |
| 2016/0303768 A1* | 10/2016 | Usui | B29B 9/065 |
| 2017/0037168 A1* | 2/2017 | Nagao | C08F 216/06 |

FOREIGN PATENT DOCUMENTS

| CN | 1490350 A | 4/2004 |
| TW | 201531489 A | 8/2015 |

* cited by examiner

*Primary Examiner* — Ronak C Patel
(74) *Attorney, Agent, or Firm* — Nixon Peabody LLP; Thomas P. Pavelko

(57) ABSTRACT

Extruded films comprising ethylene vinyl alcohol copolymer (EVOH) with substantially no blow holes therein, are formed by using a pellet feed to the extruder wherein 90-100 wt. % of the pellets pass through an ASTM size 5 sieve and 0-10 wt. % of the pellets are finer than a number 10 mesh (ASTM Sieve size). Uniform feeding to and through the extruder with a lack of bridging of the EVOH pellet feed have been observed.

7 Claims, 2 Drawing Sheets

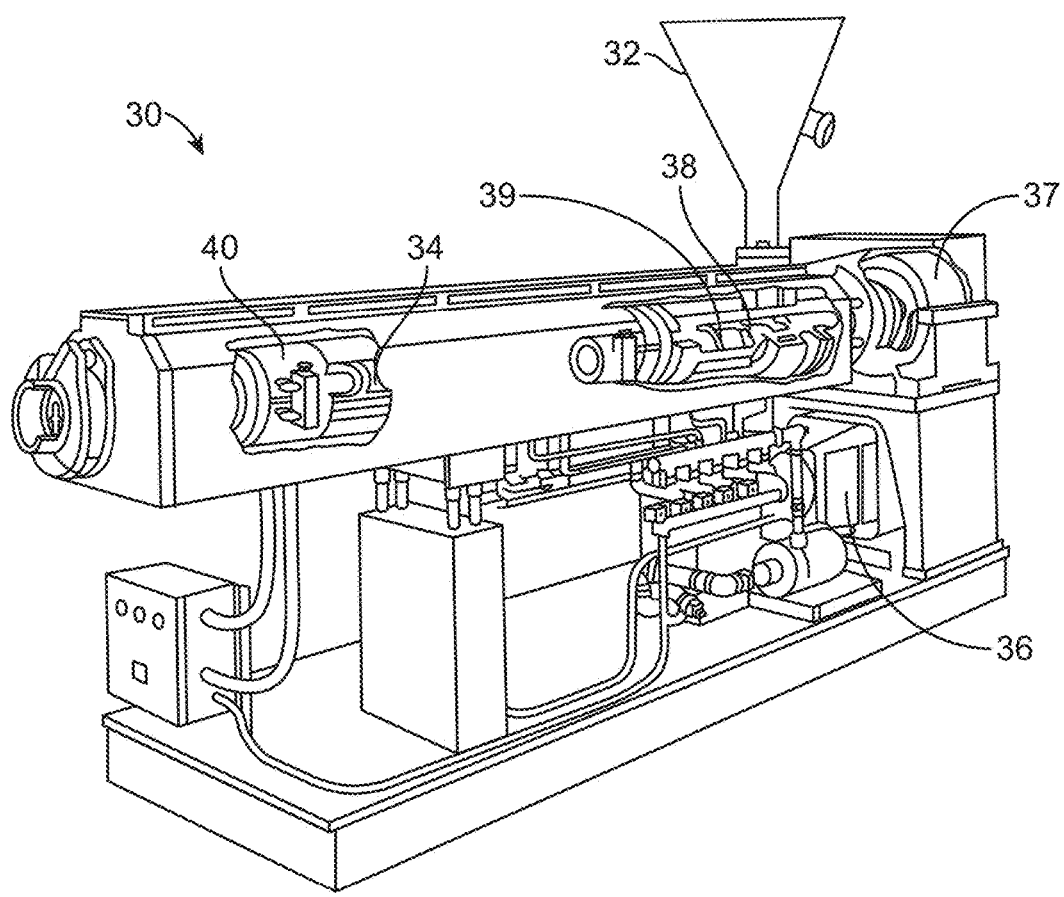
FIG. 2
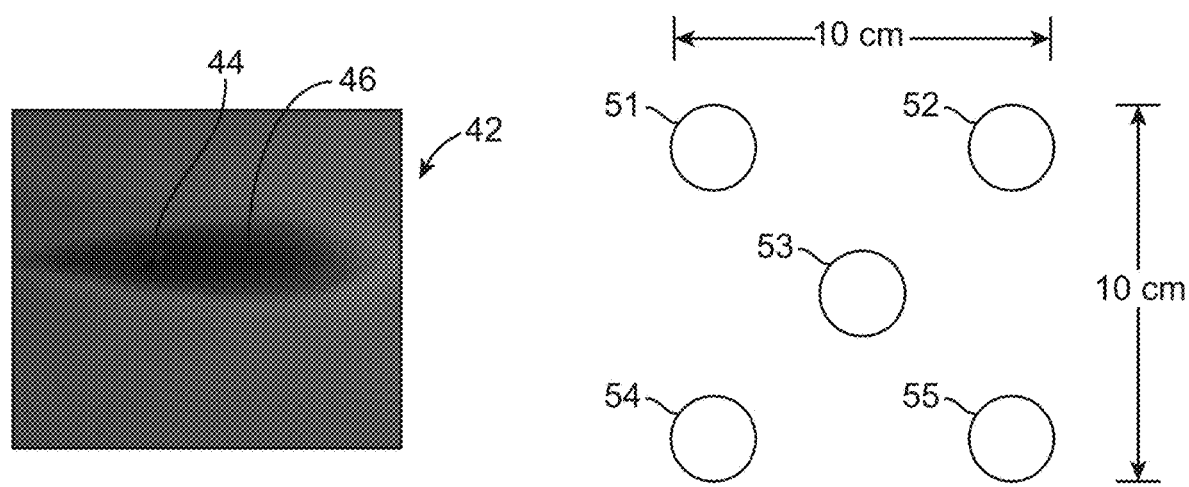
FIG. 3
FIG. 4

ETHYLENE VINYL ALCOHOL COPOLYMER PELLET, METHOD FOR EXTRUSION OF THE PELLET AND EXTRUSION MOLDED FILM PRODUCED THEREBY

TECHNICAL FIELD

The present disclosure describes an ethylene vinyl alcohol copolymer ("EVOH") pellet that provides improved delivery efficiency of the pellet to various apparatus, such as an extruder. Pellets (or particles) disclosed herein avoid feed problems, such as bridging of the pellets in hoppers and conveying zones of typical extruders, thereby increasing the stability of delivery at the extrusion die. The pellet of the disclosed embodiments produces superior films when extruded, without blow holes in the final product. The improved films show good performance in oxygen barrier properties. The films produced by the pellet of the disclosed embodiments can also be utilized in co-extrusion embodiments. In the method of making the pellets of the present disclosure, two production lines are not required as in the prior art. Furthermore, the cutting of the EVOH pellets is performed under water, unlike the hot-cutting, which introduces a different thermal history to the finished pellets. Other advantages of cutting the EVOH pellets under water, permits easy addition of additives to the pellet.

BACKGROUND

Ethylene vinyl alcohol copolymer is a well know polymer that can be produced by a two-step process of polymerization and saponification as follows:

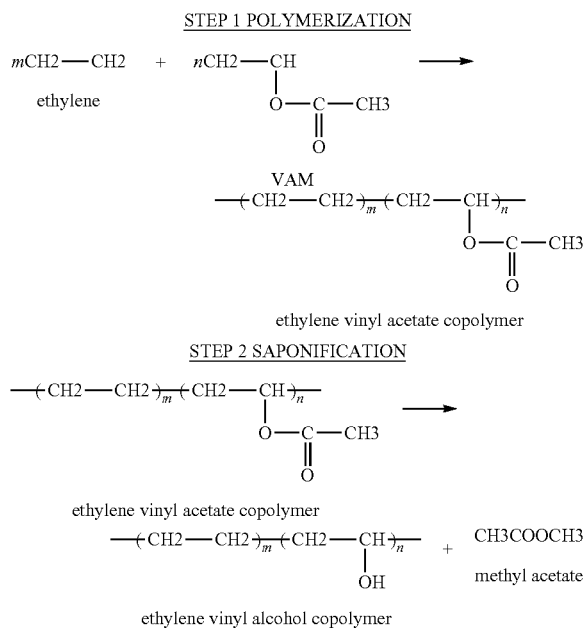

As a result of this two-step process of polymerization and saponification, polymer can be produced in pellet form. However, the production of the pellet is not uniform in size. When attempting to utilize the EVOH pellets of the prior art, there is a problem of poor delivery efficiency in feeding the extruder used to produce films of the EVOH. This poor efficiency and instability in feeding the extruder can be observed in an unstable operating electric current in the motor turning the extruder screw; and blow holes or translucent irregularities as evident by visual or instrument inspection of the final product. Because ethylene vinyl alcohol copolymer is a semi-crystalline random copolymer of ethylene and vinyl alcohol and has high transparency, it is widely and most commonly used as packaging structures for perishable foods. However, one of the most important properties required for this use is its superior barrier properties to oxygen. Ethylene vinyl alcohol copolymer films that have translucent irregularities and/or low oxygen barrier properties caused by blow holes in the film are therefore not acceptable films.

As a result of observing these phenomena, the present inventors realized that production of inferior ethylene vinyl alcohol copolymer films was attributable to bridging occurring in the mass of pellets being introduced into, and/or conveyed by the extruder screw. Bridging among the mass of individual pellets means that there is a non-uniform, or even absence, of conveying pellets immediately downstream of the bridging phenomena. Bridging is also one of the reasons that unstable operating electric currents are observed in the electric motor turning the extruder screw. Bridging among the mass of pellets also accounts for the occurrence of blow holes in the final product as the result of unequal metering and conveying of the mass of pellets through the extruder.

Prior art attempts at solving bridging problems were directed at mixing pellets of circular or elliptical cross-section pellets (A1) with pellets of cylindrical shape (A2) in a specified ratio of pellets of A1:A2 being from 99:1 to 20:80 as described in Taiwanese published patent application TW 201531489A. The problem with such a solution required two production lines to form pellets of two distinctive shapes, plus the additional step of mixing the pellets of two different shapes in a specific ratio. Another attempt at extrusion of EVOH copolymer resin can be found in Chinese patent CN 1262595C in which an EVOH copolymer resin was fed into an extruder and while maintain the temperature of the melting resin at 70 to 170° C., and adjusting the amount of water by supplying or removing water in the extruder. Alkali metal salt or alkali earth metal salt was added to the extruder which was the reason that the water content was controlled. However, ethylene vinyl alcohol copolymer is a hydrophilic material, so the ethylene vinyl alcohol copolymer resin must be dry prior to extrusion processing. Not only is this prior process costly, but the additive and water content in the extruder might reduce the heat resistance and other properties of the final product.

Thus, there currently does not exist any known manner of improving the stability of delivery of EVOH copolymer pellets to an extruder in order to produce high quality film without blowholes, translucent irregularities and/or poor oxygen barrier properties.

SUMMARY

As a result of the extensive efforts of the inventors, it was unexpectedly discovered that part of the problem of poor ethylene vinyl alcohol copolymer extruded film properties is caused by bridging effect of EVOH copolymer pellets fed to an extruder for the production of the film that is caused by the presence of relatively small particles in a mass of pellets which leads to the instability of delivery. By carefully controlling the particle size distribution of the EVOH pellets and other pellet property characteristics, the present inventors have overcome the problems of bridging effect of the pellets and improved the feeding of extruder.

In one embodiment, applicants produce ethylene vinyl alcohol copolymer pellets exhibiting a particle size distribution whereby 90-100 wt. % of the pellets are in the range of 5-10 mesh (ASTM E11 sieve size), and 0-10 wt. % of the pellets are finer than a number 10 mesh (ASTM E11 sieve size). It is to be understood that all mesh sizes mentioned in this application and the appended claims are based upon an ASTM E11 sieve size, but that it should also be understood that equivalent particle size and particle size distributions utilizing other mesh systems can be obtained which have equivalent properties to the pellets measured by the ASTM E11 sieve sizes disclosed herein.

In other embodiments, applicants provide EVOH pellets which exhibit an angle of repose in the range of less than 30 degrees, preferably in the range of 20-30 degrees, more preferably in the range of 20-27 degrees. In several embodiments of this disclosure, angles of repose of 20.275 degrees, 21.305 degrees, 21.52 degrees, 21.61 degrees, 22.3 degrees, 23.5 degrees, 25.5 degrees, and 26.5 degrees are exemplified.

In a still further embodiment, applicants provide EVOH pellets having an ethylene content in the range of 24-48 mole %.

In other embodiments, the EVOH pellets exhibit hydrolysis of at least 95 mole %, and preferably greater than 99.5 mole %.

In still further embodiments, the EVOH pellets exhibit a bulk density of at least 0.7 g/ml, and preferably in the range of 0.70-0.80 g/ml. In several embodiments bulk densities of 0.7105, 0.7325, 0.7458, 0.7562, 0.7652, 0.7851, 0.7862, 0.7899, and 0.7921 are exemplified.

In an embodiment of the disclosure, extruded films comprising EVOH exhibiting substantially no blow holes can be produced.

In still further embodiments, preferred extrusion molded EVOH films exhibit an oxygen transmission rate ("OTR") of 0.08-3.2 ml*20 μm/m$^2$*day*atm. The oxygen transmission rate is used to evaluate the uniformity of the film. Assuming that this film transmits oxygen uniformly over several points, the oxygen transmission rate of its multiple points are similar. Therefore, we consider that the thickness of this film is uniform. To the contrary, a difference in oxygen transmission rate of the facets of one embodiment being very large, represents that the film is not uniform (Comparative Example).

In further embodiments, extrusion molded EVOH films formed from the aforementioned pellets are coextruded with at least one other polymer film to produce multilayer extruded films. These multilayered films can be uni-axially or bi-axially stretched by the technique known in the art as the blown film technique. Suitable other polymers that may be coextruded with the EVOH films include various forms of polyethylene (PE), including, but not limited to, low density polyethylene and polyethylene-graft-maleic-anhydride, polypropylene (PP), nylon, tie-resin, and poly(vinylidene chloride). Typical extrusion molded films can be five-layered EVOH films being PE/Tie/EVOH/Tie/PE in sequence. Typical extrusion molded films can be seven-layered EVOH films being PE/Tie/Nylon/EVOH/Nylon/Tie/PE in sequence.

Other embodiments include improving the feeding of an extruder with EVOH pellets, and methods of controlling the bridging of EVOH pellets in feeding such pellets through various parts of an extruder, including but not limited to, a hopper, the metering, conveying and/or mixing sections of a single, dual or multi-screw extruder.

The foregoing and other embodiments of the disclosure will be further described in connection with the appended drawings and the following detailed description of the preferred embodiments.

BRIEF DESCRIPTION OF THE DRAWINGS

FIG. 2 is a schematic, partially sectioned illustration of components of a single screw extruder;

FIG. 3 is a microphotograph of a comparative example of an EVOH film, which exhibits a blowhole and an opaque portion in an otherwise transparent film; and, FIG. 4 is a schematic illustration of a test method for examining film for blowholes.

DETAILED DESCRIPTION OF PREFERRED EMBODIMENTS

Figure 1:
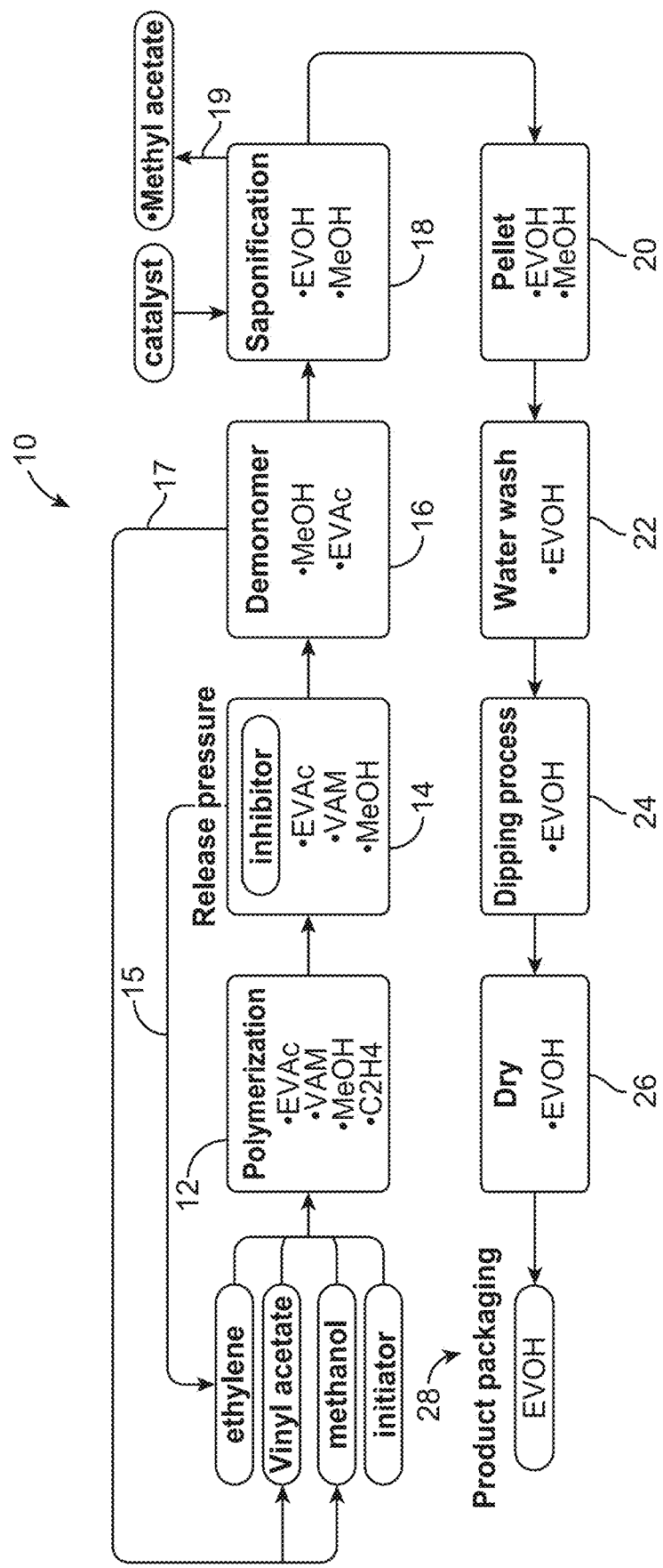
FIG. 1 is a schematic diagram of one process for polymerizing, saponification and production of EVOH pellets.

The various embodiments will be further understood by reference to the following Examples. However, it should be expressly understood that the Examples are for exemplary purposes only and are not intended to limit the embodiments that may fall within the appended claims. As illustrated in FIG. 1 is a process 10 for polymerizing ethylene and vinyl acetate in the presence of methanol and an initiator in a first reactor 12 to produce ethylene vinyl acetate copolymer. The initiators may be azo initiators, such as azobisisobutyronitrik, azobis isobutyl nitrile heptyl, dimethyl azobisisobutyrate, azobis (2-methylbutyronitrile) and the like; it may be peroxide initiators such as hydrogen peroxide, ammonium persulfate, potassium persulfate, or organic peroxides, such as benzoyl peroxide, benzoyl peroxide, t-butyl, methyl ethyl ketone peroxide, isobutyryl peroxide, Tert-amylperoxyneodecanoate, bis (4-tert-butyl cyclohexyl acetate), tert peroxide acetate, Tert-amyl peroxy pivalate, bis-butyl peroxydicarbonate, Di-n-propyl peroxydicarbonate, and the like. This copolymer is transferred into reactor 14, in the presence of methanol and an inhibitor, The inhibitor may be conjugated polyenes, such as isoprene, 2,3-dimethyl-1, 3-butadiene, 2,3-diethyl-1,3-butadiene, 2-t-butyl-1,3 butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl 1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3 butadiene, 1,4-diphenyl-1,3-butadiene, 1-methoxy-1,3 butadiene, 2-methoxy-1,3-butadiene, 1-ethoxy-1,3 butadiene, 2-ethoxy-1,3-butadiene, 2-nitro-1,3-butadiene, chloroprene, 1-chloro-1,3-butadiene, 1-bromo-1,3 butadiene, 2-bromo-1, 3-butadiene, fulvene, tropone, ocimene, phellandrene, myrcene, farnesene, cembrane, sorbic acid, sorbic acid esters, sorbic acid salts, abietic acid, cinnamic acid, and cinnamic acid salt. Unreacted ethylene is recycled, under reduced pressure, via process stream 15 to make-up the initial feedstock of ethylene in the polymerization process. The effluent of reactor 14 is transferred to a demonomerizing vessel 16, from which unreacted monomer of vinyl acetate and methanol are recycled, via process stream 17 to make-up the initial feedstock of vinyl acetate monomer and methanol. The resulting ethylene vinyl acetate copolymer is transferred to saponification vessel 18, in the presence of a suitable catalyst, such as an alkaline catalyst to saponify the ethylene vinyl acetate into ethylene vinyl alcohol and methyl acetate as a by-product. The methyl acetate is removed from saponification vessel 18 via by-product stream 19. An alkali catalyst, may be selected from an alkali metal hydroxide, alkoxides, such as sodium hydroxide, potassium hydroxide, sodium methoxide, sodium ethoxide, potassium methoxide and the like. It is generally preferred to use hydroxide sodium. The remaining ethylene vinyl alcohol copolymer is dissolved in methanol/water to produce an ethylene vinyl alcohol/methanol/water solution and the solution run through a pelletizing process in pelletizer 20. Preferably, the solution has a solids content of at least 38 wt. %. In several embodiments solid content of 38, 39, 41, and 42 are exemplified. Pelletizer 20 comprises an inlet pipe, with different diameter to produce pellets in different diameter. Preferably, the diameter of the inlet pipe is in the rage of 1.6 to 2.8 mm. Pelletizer 20 comprises a rotating knife (sometimes called a rotating cutter), with the rotation of the knife being variable in speed to produce different size pellets. Preferably, the knife speed of rotation is in the range of 1500-3000 rpm. Preferably, the rotating knife is submerged under water during pelletizing of the EVOH containing stream. Cutting under water does not affect the thermal history of the pellets. When hot-cutting as in the prior art, the heat imparted during cutting affects the thermal (heat) history of the resultant pellets, deleteriously affecting pellet properties as well as products, such as films, formed from such pellets. After pelletizing, the EVOH pellets are cooled and centrifuged, then water washed in vessel 22, dipped in vessel 24 containing a pH adjustment solution, the PH adjustment solution may be organic acid, inorganic acid or their salt, such as acetic acid, acetic acid salt, formic acid, formic acid salt, malonic acid, malonic acid salt, propionic acid, propionic acid salt, succinic acid, succinic acid salt, boric acid, boric acid salt, citric acid, citric acid salt, phosphoric acid, phosphoric acid salt, meta-phosphoric acid and meta-phosphoric acid salt, the PH value of vessel 24 is about 3 to about 6, and the preferred range is about 4 to about 5, dried in drier 26 and packaged at 28. At this stage the packaged pellets have a wide range of particle size distribution in the range of 5 to 20 mesh, a variety of particle shapes. Intermediate the drying and packaging steps, or after packaging, the pellets can be sieved to regulate the particle size distribution. The sieved pellets were poured into a bulk density apparatus five times to record an average bulk density. Measurements of angle of repose were measured by a powder tester.

As illustrated in the schematic diagram of FIG. 2 of a typical single screw extruder 30, there are several points at which bridging of a pellet feed may occur. One is at the hopper 32 of the extruder in which bridging of a pellet feedstock make starve the screw 34 of feedstock, resulting in an over revolution of the screw 34 under uniform current to the electric motor 36 turning the screw through intermediate gearbox 37. Although we have exemplified a single screw extruder, bridging may occur at various points of and in various types of extruders. For example, in the hopper of single screw, dual screw and multi-screw extruders, and in the metering, conveying and/or mixing sections of these extruders.

A second point in which bridging may occur is in the conveying portion of the screw 34 in which some of the flights 38, 39 of the screw 34 may experience irregular, diminished or absence of pellets due to bridging of the pellets downstream of the hopper 32, but within one or more flights 38, 39 of the screw, prior to the melting section 40. This irregular, diminished or absence of pellets could also account for variations in the electric current to the electric motor 36 driving the screw 34.

Therefore, in order to diminish the likelihood of bridging, the pellets produced from the pelletizing apparatus are, subsequent to the water washing and drying steps, graded by sieving. Applicant have found that sieving to produce polymer pellets exhibiting a particle size distribution in which 90-100 wt. % of the pellets are in the range of 5-10 mesh, and 0-10 wt. % of the pellets are finer than a number 10 mesh, the likelihood of bridging and uneven feeding of the pellets to and through an extruder will be diminished.

Unexpectedly, applicants also found that the resulting EVOH film product formed from such an extrusion will not exhibit translucent portions, nor substantially any blowholes, in the otherwise transparent film.

By controlling the appropriate particle size distribution of the pellets, the angle of repose, and the apparent bulk density of the EVOH pellets, especially the bulk density is at least 0.7 g/ml, more specifically, the bulk density is about 0.7 g/ml-0.8 g/ml, not only improved distribution and feeding of an extruder occur, but a superior extruded film comprising EVOH will occur, having uniform film thickness, the substantial absence of translucent portions or blowholes, high transparency, and excellent oxygen barrier properties. These properties of the extrusion molded EVOH film will be maintained even when this film is co-extruded with other polymer films, especially ethylene and ethylene-graft-maleic-anhydride co-extruded films. In addition to the extruded polyethylenes described above, tie resins can be used between the EVOH layer and any other extruded layer. Various tie resins are known for bonding dissimilar polymers together, primarily in multilayer, co-extruded structures. Tie resins are commercially available in the United States from companies such as Lyondell Basell under the PLEXAR brand, or from DOW Chemical under the AMPLIFY™ TY Functional Polymers brand.

The properties of the EVOH pellets and resulting extruded products made therefrom will be apparent when viewed in light of the following examples and comparative examples as set forth below.

EXAMPLES

Example 1

1. An ethylene-vinyl acetate copolymer (EVAc) with ethylene content of 32 mole % is made according to the general process set forth in FIG. 1. After saponifying to EVOH (Ethylene Vinyl Alcohol copolymer), the EVOH was dissolved into methanol/water (70:30 ratio) to be EVOH/Methanol/water solution (solid content of solution: 41 wt. %), with the solution kept at 60° C. and then run the pelletizing process.

2. The EVOH solution above is then pumped to feeding tube with 120 L/min flow rate, then the EVOH solution passed to inlet pipe having a diameter of 2.8 mm, and cut by 1,500 rpm rotating knife, at the same moment the pellet is cooled to 5° C. to form EVOH pellet.

3. The pellets obtained above were centrifuged to separate EVOH particles, the separated EVOH particles washed with water and dried to get EVOH pellet final product.

4. The EVOH pellets are screened by 8 mesh (ASTM E11 sieve size) sieve to obtain the EVOH pellet sample.

5. The EVOH pellets were analyzed by the following test methods:

1) Grain size distribution analyzed by JIS K6726 1994, but measured by ASTM E11 sieve size, (size: 5, 8, 10, 14, 20 mesh)
2) Bulk Density: The EVOH pellets were poured into bulk density apparatus, made by KARAMOCHI (analysis method ISO-60-1977) five times and the average bulk density recorded. Analysis method, ISO-60-1977, is an International Standard for specifying the apparent density, i.e., the mass per unit of volume, of loose material (powder or granular material) that can be poured from a funnel of specified design. The apparatus utilized in the test method, includes a balance, accurate to 0.1 g, a measuring cylinder and funnel. The apparatus and test method specified in ISO-60-1977, are herein incorporated by reference as though fully described herein.
3) Angle of repose ($\alpha$): The repose angle of the EVOH pellets were measured by powder tester (A.B.D. powder tester ABD-100, made by TSUTSUI SCIENTIFIC INSTRUMENTS Co. Ltd.). Angle of repose is analyzed by JIS R 9301-2-2:1999.

6. Multilayer film
1) The EVOH pellets (I), polyethylene (Lotrene FD0274) (II) and the following resins, polyethylene-graft-maleic-anhydride (III) (ADMER NF408E, manufactured by Mitsui Chemicals, Inc.), were fed into a 3-Layer Co-Extrusion Blown Film Machine. The thicknesses of the multilayer film are (I)/(III)/(II)=20/10/100 µm.
2) Appearance: After manufacturing the multilayer film for 24 hours, 5 spots (51, 52, 53, 54 and 55) are selected having an area of 10*10 cm (as shown in FIG. 4) and then the film was visually observed for blow holes, flow marks and translucent portions and evaluated according to the following criteria:
○: There is no blow hole and the film is transparent in each of the five regions selected.
Δ: There is no blow hole but some flow marks in the five regional analysis.
X: There are blow hole, flow marks or some opaque features in the five regional analysis. FIG. 3 is illustrative of a portion of a prior art film 42 exhibiting a translucent portion illustrated by flow marks 46 and a blow hole 44.
3) OTR (Oxygen Transmission Rate) analysis: In order to evaluate appearance six samples were taken which are to be analyzed by oxygen permeation analyzer (OX-TRAN 2/21 manufactured by Mocon) at a temperature of 20° C. and at a humidity of 65 RH % (following ISO 14663-2).
4) Uniformity: Scraping uneven place with a razor, so that surface of the samples is smooth. The thickness of the sample is measured by Optical Microscope, and the following are some criteria that one can judge the thickness of the film:
○: variation of thickness is less than 10% in each of the five regions.
Δ: variation in thickness is between 10% and 20% in each of the five regions.
X: variation in thickness is more than 20% in each of the five regions.

Example 2

There are three independent variables which are changed from Example 1: (1) the EVOH solids content of solution is 39 wt. %, (2) the diameter of the inlet pipe of 1.6 mm and the speed of the rotating knife set to 2,500 rpm, (3) Screen the EVOH pellets by 10 mesh (ASTM E11 sieve size) sieve. Other factors are controlled variables which are the same as in Example 1.

Example 3

There are three independent variables which are changed from Example 1: (1) the EVOH solids content of solution is 38 wt. %, (2) the diameter of the inlet pipe of 2.4 mm and the speed of the rotating knife set to 1,800 rpm, (3) Screen the EVOH pellets by 10 mesh (ASTM E11 sieve size) sieve. Other factors are controlled variables which are the same as in Example 1.

Comparative Example 1

The speed of the rotating knife is changed to 6,000 rpm and the sieve is 14 mesh. Other variables are the same as with Example 1.

Comparative Example 2

The speed of the rotating knife is changed to 5,000 rpm and the sieve is 20 mesh. Other variables are the same as with Example 2.

Comparative Example 3

The speed of the rotating knife is changed to 8,000 rpm without sieve. Other variables are the same as with Example 3.

Example 4 to Example 6

Controlled variables are ethylene content, diameter, temperature, and mesh size of vibration screen (mesh).

Comparative Example 4

The speed of the rotating knife is changed to 6,000 rpm and the sieve is 14 mesh, other factors are the same as with Example 4.

Comparative Example 5

The speed of the rotating knife is changed to 6,000 rpm and the sieve is 20 mesh, other factors are the same as with Example 5.

Comparative Example 6

The speed of the rotating knife is changed to 6,000 rpm and (2) no mesh, other factors are the same as with Example 6.

Example 7

There are four independent variables which are changed from Example 1: (1) the speed of the cutter set to 3,000 rpm, and (2) EVOH Solid content of solution 39 wt. %, (3) the diameter of the inlet pipe is 1.6 mm. and (4) Screen the EVOH pellets by 10 mesh (ASTM E11 sieve size) sieve. Other factors are controlled variables which are the same as in Example 1.

Example 8

There are three independent variables which are changed from Example 1: (1) the ethylene content is 24 mole %, (2)

the speed of the rotating knife is set to 2,500 rpm. Other factors are controlled variables which are the same as in Example 1.

Example 9

There are three independent variables which are changed from Example 1: (1) the ethylene content is 48 mole %, (2) the speed of the rotating knife is set to 1,800 rpm, (3) Screen the EVOH pellets by 10 mesh (ASTM E11 sieve size) sieve, and (4) the hydrolysis degree is 99.5 mole %. Other factors are controlled variables which are the same as in Example 1.

The samples from the Examples and Comparative Examples were tested according to the following procedure:
Test Procedure—Grain Size (Grain Size Distribution Analyzed by JIS K6726 1994)
1) Summary—Sift sample according to JIS Z 8815 (JIS Z8815 is derived from JIS K6726 1994) and find the mass (%) left on each sieve opening of test sieves.
2) Implement and apparatus—Implement and apparatus shall be as follows:
   (a) Test sieves—Specified in JIS Z 8801 (JIS Z8801 is derived from JIS K6726 1994)
   (b) Electric horizontal vibrator (*)—Capable of setting such condition as 200 to 300 vibrations per minute, 5.0 cm of amplitude and about 150 tappings per minute.
   Note (*) When using other type of vibrator than the type above-mentioned, establish the condition previously so as not to make any difference of result between those vibrators.
3) Operation—Operation shall be as follows:
   (a) Weight 100 g of sample to the nearest 100 mg, set up test sieves, and give them a vibration for 15 min by an electric horizontal vibrator under the condition of 200 to 300 vibrations per minute, 5.0 cm of amplitude, and about 150 tappings per minute.
   (b) After finishing of vibration, weigh the mass left on each sieve opening of the test sieves immediately to the nearest 100 mg, and express each mass in terms of percentage (%). Value shall be a whole number.

The results of the Examples and Comparative Examples are set forth in the following Tables.

TABLE 1

|  | Ex. 1 | Ex. 2 | Ex. 3 | Comp. Ex. 1 | Comp. Ex. 2 | Comp. Ex. 3 |
|---|---|---|---|---|---|---|
| Ethylene content (mole %) | 32 | 32 | 32 | 32 | 32 | 32 |
| Hydrolysis Degree (mole %) | 99.6 | 99.6 | 99.6 | 99.6 | 99.6 | 99.6 |
| Solids content of solution (wt %) | 41 | 39 | 38 | 41 | 39 | 38 |
| Diameter (mm) | 2.8 | 1.6 | 2.4 | 2.8 | 1.6 | 2.4 |
| Knife speed (rpm) | 1500 | 2500 | 1800 | 6000 | 5000 | 8000 |
| Temperature of solution (° C.) | 60 | 60 | 60 | 60 | 60 | 60 |
| Cooling temperature (° C.) | 5 | 5 | 5 | 5 | 5 | 5 |
| Mesh size of vibrating screen (mesh) | 8 | 10 | 10 | 14 | 20 | None |
| Particle size distribution (mesh) | | | | | | |
| 5-8 | 100% | | 80% | 10% | | |
| 8-10 | | 100% | 20% | 90% | | |
| 10-14 | | | | | 20% | |
| 14-20 | | | | | 80% | |
| Pass 20 | | | | | | 100% |
| Bulk density (g/ml) | 0.7899 | 0.7862 | 0.7921 | 0.6368 | 0.6205 | 0.591 |
| Angle of repose (°) | 20.275 | 21.305 | 21.52 | 33.505 | 34.865 | 35.85 |
| OTR for 5 point (ml * 20 um/m$^2$ · day · atm) | 0.38/0.37/ 0.41/0.39/ 0.38 | 0.40/0.40/ 0.41/0.38/ 0.37 | 0.39/0.38/ 0.39/0.40/ 0.42 | 0.42/6.98/ 3.58/2.59/ 4.25 | 5.82/9.85/ 3.62/5.25/ 10 | 2150/2200/ 1860/1870/ 7.5 |
| OTR average (ml * 20 um/m$^2$ · day · atm) | 0.386 | 0.392 | 0.396 | 3.564 | 6.908 | 1617.5 |
| Uniformity for thickness | ◯ | ◯ | ◯ | Δ | Δ | X |
| Appearance | ◯ | ◯ | ◯ | Δ | X | X |

TABLE 2

|  | Ex. 4 | Ex. 5 | Ex. 6 | Comp. Ex. 4 | Comp. Ex. 5 | Comp. Ex. 6 |
|---|---|---|---|---|---|---|
| Ethylene content (mole %) | 38 | 44 | 29 | 38 | 44 | 29 |
| Hydrolysis Degree (mole %) | 99.5 | 99.6 | 99.5 | 99.5 | 99.6 | 99.5 |
| Solids content of solution (wt. %) | 42 | 41 | 41 | 42 | 41 | 41 |
| Diameter (mm) | 2.8 | 2.8 | 2.8 | 2.8 | 2.8 | 2.8 |
| Knife speed (rpm) | 1500 | 2500 | 1800 | 6000 | 6000 | 6000 |
| Temperature of solution (° C.) | 60 | 60 | 60 | 60 | 60 | 60 |
| Cooling temperature (° C.) | 5 | 5 | 5 | 5 | 5 | 5 |
| Mesh size of vibrating screen (mesh) | 8 | 10 | 10 | 14 | 20 | none |
| Particle size distribution (mesh) | | | | | | |
| 5-8 | 100% | 30% | 90% | 5% |  | 5% |
| 8-10 |  | 70% | 10% | 10% | 10% | 7% |
| 10-14 |  |  |  | 85% | 30% | 20% |
| 14-20 |  |  |  |  | 60% | 30% |
| Pass 20 |  |  |  |  |  | 38% |
| Bulk density (g/ml) | 0.7458 | 0.7325 | 0.7105 | 0.6821 | 0.6325 | 0.6915 |
| Angle of repose (°) | 22.3 | 25.5 | 23.5 | 31.5 | 32.3 | 33.25 |
| OTR for 5point (ml * 20 um/m² · day · atm) | 0.35/0.41/ 0.36/0.32/ 0.35 | 1.35/1.32/ 1.41/1.33/ 1.42 | 0.28/0.31/ 0.27/0.25/ 0.26 | 0.78/6.31/ 5.85/3.52/ 9.51 | 7.25/7.77/ 6.52/2.15/ 10.52 | 10.5/9.8/ 10.3/5.8/ 6.7 |
| OTR average (ml * 20 um/m² · day · atm) | 0.36 | 1.37 | 0.27 | 5.19 | 6.84 | 8.62 |
| Uniformity for thickness | ○ | ○ | ○ | Δ | Δ | Δ |
| Appearance | ○ | ○ | ○ | Δ | Δ | Δ |

TABLE 3

|  | Ex. 7 | Ex. 8 | Ex. 9 |
|---|---|---|---|
| Ethylene content (mole %) | 32 | 24 | 48 |
| Hydrolysis Degree (mole %) | 99.6 | 99.6 | 99.5 |
| Solids content of solution (wt. %) | 39 | 41 | 41 |
| Diameter (mm) | 1.6 | 2.8 | 2.8 |
| Knife speed (rpm) | 3000 | 2500 | 1800 |
| Temperature of solution (° C.) | 60 | 60 | 60 |
| Cooling temperature (° C.) | 5 | 5 | 5 |
| Mesh size of vibrating screen (mesh) | 10 | 10 | 10 |
| Particle size distribution (mesh) | | | |
| 5-8 | 95% | 30% | 80% |
| 8-10 | 5% | 60% | 20% |
| 10-14 |  | 10% |  |
| 14-20 |  |  |  |
| Pass20 |  |  |  |
| Bulk density (g/ml) | 0.7851 | 0.7562 | 0.7652 |
| Angle of repose (°) | 21.61 | 23.5 | 26.5 |
| OTR for 5point (ml * 20 um,/m² · day · atm) | 0.42/0.39/ 0.43/0.45/ 0.46 | 0.17/0.15/ 0.08/0.13/ 0.21 | 3.1/2.8/ 2.5/3.2/ 2.7 |
| OTR average (ml * 20 um/m² · day · atm) | 0.430 | 0.148 | 2.302 |
| Uniformity for thickness | ○ | ○ | ○ |
| Appearance | ○ | ○ | ○ |

It is counterintuitive that fine pellets (with a particle size distribution of 90 to 100 wt. % of the pellets being 5-10 mesh) should be able to avoid feeding problems. When the particle size distribution decreases in size, it would be expected that the specific surface area increases, causing a larger friction between the particles in a mass of particles. Therefore, as the friction between the pellets increases, it would be expected that feeding problems would arise, such as in the hopper and conveying areas of a typical extruder. Such bridging problem produce instability in the delivery of the pellets during extrusion, resulting in several defects, including blow holes in an extruded film. Here, however, the results obtained by providing EVOH pellets exhibiting a particle size distribution whereby 90-100 wt. % of the pellets are in the range of 5-10 mesh (ASTM E11 sieve size) and 0-10 wt. % of the pellets are finer than a number 10 mesh, produces unexpected results. In this specific proportion, an extrusion molded EVOH film, wherein at least one of the layers comprises a film formed from extruding these ethylene vinyl copolymer pellets with good uniformity, low porosity and almost without blow holes can be obtained. Furthermore, while we have described our embodiments, they should be regarded as exemplary only and not limiting, as many modifications can be made by those skilled in the art without departing from the spirit or scope of the appended claims.

The disclosure of specific, including preferred embodiments, is intended to be exemplary of the embodiments described herein, but should not be construed as limiting the disclosure, parameters, process or method steps, extruded films or other products incorporating the same.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

We claim:

1. Ethylene vinyl alcohol copolymer (EVOH) pellets exhibiting a particle size distribution of 90-100 wt. % of the pellets in the range of 5-10 mesh (ASTM E11 sieve size), and 0-10 wt. % of the pellets finer than number 10 mesh (ASTM E11 sieve size); wherein the EVOH pellets have an ethylene content in a range of 24-48 mole %, an hydrolysis of the ethylene vinyl alcohol copolymer of at least 95 mole %, and exhibit an angle of repose in the range of 20 to 30 degrees.

2. The EVOH pellets of claim 1, wherein the pellets exhibit a bulk density of at least 0.7458 g/ml.

3. An extrusion molded EVOH film, comprising at least one layer, wherein at least one layer comprises a film formed from extruding the EVOH pellets of claim 1.

4. The extrusion molded EVOH film of claim 3, further comprising at least one other layer, said at least one other layer selected from the group consisting of polyethylene, polyethylene-graft-maleic-anhydride, nylon, and polypropylene and tie resin to be coextruded with the EVOH film; wherein the tie resin is a resin known to bond dissimilar polymers together.

5. The extrusion molded EVOH film of claim 3, which exhibits substantially no blow holes.

6. Ethylene vinyl alcohol copolymer (EVOH) pellets, wherein the EVOH pellets exhibit a particle size distribution consisting of 90-100 wt. % of the pellets in the range of 5-10 mesh (ASTM E11 sieve size), and 0-10 wt. % of the pellets finer than number 10 mesh (ASTM E11 sieve size); wherein the EVOH pellets have an ethylene content in the range of 24-48 mole %, an hydrolysis of the ethylene vinyl alcohol copolymer of at least 95 mole %, an angle of repose in the range of 20-30 degrees; and a bulk density in the range of 0.7-0.8 g/ml.

7. An extrusion molded film comprising EVOH formed by extruding the pellets of claim 6.

* * * * *